United States Patent [19]
Wakeland

[11] Patent Number: 5,218,432
[45] Date of Patent: Jun. 8, 1993

[54] METHOD AND APPARATUS FOR MERGING VIDEO DATA SIGNALS FROM MULTIPLE SOURCES AND MULTIMEDIA SYSTEM INCORPORATING SAME

[75] Inventor: Carl K. Wakeland, Bedford, Tex.

[73] Assignee: Tandy Corporation, Fort Worth, Tex.

[21] Appl. No.: 815,985

[22] Filed: Jan. 2, 1992

[51] Int. Cl.5 .............................................. H04N 9/74
[52] U.S. Cl. ...................................... 358/22; 358/903
[58] Field of Search .......... 358/22 CK, 22 PIP, 22 C, 358/22, 183, 181, 182, 903, 148

[56] References Cited

U.S. PATENT DOCUMENTS

| | | | |
|---|---|---|---|
| 4,488,169 | 12/1984 | Yamamoto | 358/22 |
| 4,599,611 | 7/1986 | Bowker et al. | 358/22 X |
| 4,682,297 | 7/1987 | Iwami | 358/183 X |
| 4,827,253 | 5/1989 | Maltz | 358/22 X |
| 4,985,755 | 1/1991 | Shimoda et al. | 358/22 |

FOREIGN PATENT DOCUMENTS

| | | | |
|---|---|---|---|
| 7710959 | 10/1978 | Netherlands | 358/22 |
| 1556811 | 11/1979 | United Kingdom | 358/22 |

*Primary Examiner*—James J. Groody
*Assistant Examiner*—Safet Metjahic
*Attorney, Agent, or Firm*—David L. McCombs; Michael S. Bush

[57] ABSTRACT

A method for merging first and second digital video signals generated by first and second video controllers, respectively, for merged transmission to a digital video decoder. The first video controller transmits the first digital video signal to the decoder while monitoring the signal to detect a luminance component which designates the boundary between a first image constructable from the first video signal and a second image constructable from the second video signal. When the luminance component is detected, a colorkey signal is generated by the first video controller and transmitted to the second video controller to initiate transmission of the second digital video signal to the decoder in place of the first digital video signal. The first video controller continues to monitor the first video signal until the absence of the luminance component is detected. The first video controller then transmits a second colorkey signal to the second video controller to terminate the second digital video signal and transmission of the first digital video signal to the decoder recommences.

17 Claims, 4 Drawing Sheets

Y0 (BYTE 1)

| 7 | 6 | 5 | 4 | 3 | 2 | 1 | 0 |
|---|---|---|---|---|---|---|---|
| y7 PEL #0 | y6 PEL #0 | y5 PEL #0 | y4 PEL #0 | y3 PEL #0 | y2 PEL #0 | y1 PEL #0 | y0 PEL #0 |

U0I (BYTE 2)

| 7 | 6 | 5 | 4 | 3 | 2 | 1 | 0 |
|---|---|---|---|---|---|---|---|
| u7 PEL #01 | u6 PEL #01 | u5 PEL #01 | u4 PEL #01 | u3 PEL #01 | u2 PEL #01 | u1 PEL #01 | u0 PEL #01 |

YI (BYTE 3)

| 7 | 6 | 5 | 4 | 3 | 2 | 1 | 0 |
|---|---|---|---|---|---|---|---|
| y7 PEL #1 | y6 PEL #1 | y5 PEL #1 | y4 PEL #1 | y3 PEL #1 | y2 PEL #1 | y1 PEL #1 | y0 PEL #1 |

V0I (BYTE 4)

| 7 | 6 | 5 | 4 | 3 | 2 | 1 | 0 |
|---|---|---|---|---|---|---|---|
| v7 PEL #01 | v6 PEL #01 | v5 PEL #01 | v4 PEL #01 | v3 PEL #01 | v2 PEL #01 | v1 PEL #01 | v0 PEL #01 |

*FIG. 4a*

| PEL: | 0 | 1 | 2 | 3 |
|---|---|---|---|---|
| Y-VALUE: | Y0 | Y1 | Y2 | Y3 |
| U-VALUE: | U0 | [(U0+U2)/2] | U2 | [(U2+U4)/2] |
| V-VALUE: | V0 | [(V0+V2)/2] | V2 | [(V2+V4)/2] |

*FIG. 4b*

METHOD AND APPARATUS FOR MERGING VIDEO DATA SIGNALS FROM MULTIPLE SOURCES AND MULTIMEDIA SYSTEM INCORPORATING SAME

CROSS REFERENCE TO RELATED APPLICATIONS

This application is related to co-pending U.S. patent application Ser. Nos. 07/770,544, entitled METHOD AND APPARATUS FOR ENCODING VIDEO COLOR DATA SIGNALS AND PROTOCOL FOR ENCODING SAME and Ser. No. 07/771,310 entitled VIDEO COLOR DECODER FOR USE IN MULTIMEDIA SYSTEMS, both of which were filed on Oct. 2, 1991, assigned to the assignee of the present application and hereby incorporated by reference as if reproduced in their entirety.

BACKGROUND OF THE INVENTION

1. Field of the Invention

This invention relates generally to video signal processing techniques for multimedia systems and, more particularly, to a method and apparatus for digitally merging video data signals from multiple sources in a single display.

2. Description of Related Art

Various techniques for displaying at least two different displays of information on a video display have been disclosed in the art. Such techniques have been most commonly disclosed in connection with the development of techniques for overlaying information on a video display. For example, U.S. Pat. No. 4,200,869 to Murayama et al. discloses a system where an alphanumeric character may be superimposed over a graphical character in a manner such that the alphanumeric character may be read but the graphical character, and thus the continuity of the graphical display, is not destroyed. In Murayama et al., the output from first and second display generators are provided to an OR gate, the output of which drives a CRT. Selective prioritizing of the generated display signals is not possible in the Murayama et al. system.

Another video display system having a signal overlay capability is disclosed in U.S. Pat. No. 4,599,610 to Lacy. In Lacy, an overlay video signal, most commonly, an alphanumeric display, is given priority over a normal video signal, most commonly, a graphical display. The normal video signal is supplied to the base of a first emitter follower transistor while the overlay video signal is supplied to the base of a second emitter follower transsistor. The two transistors are biased such that the first (normal) transistor is at a slightly lower voltage than the second (overlay) transistor and is reversed biased (off) any time data is available from the overlay video signal, thereby prioritizing the display of the overlay video signal, when available, over the normal video signal.

On the other hand, to successfully merge two video images by substituting the second video image in place of the first video image poses different problems, particularly when the merging of the encoded video signals which correspond to the video images is contemplated. In order to switch from the first video signal to the second video signal while forming a merged video signal, the merged video signal will propagate the last color of the first video signal until the second video signal is available in response to a switching signal. As a result, a distinctly visible border will be formed at the transition between the first and second video images.

To avoid this problem, analog techniques have been traditionally utilized to merge video images. First and second video signals are decoded into their analog red, green and blue (or "RGB") components by respective digital-to-analog (or "D/A") converters included as part of respective digital video decoders. The first and second RGB signals are then merged at the image level using an analog switching scheme. Several disadvantages are associated with such methods. First, noise may be introduced into the displayed image since merging images by switching at the image level requires very low level analog signals. Second, in order to achieve switching at the image level, parallel video signal processing systems, including digital video signal decoders and D/A converters, are required, thereby increasing both the size and expense of such systems.

SUMMARY OF THE INVENTION

In one embodiment, the present invention is a method for merging first and second digital video signals generated by first and second video controllers, respectively, for merged transmission to a digital video decoder. A selected luminance component is designated as identifying a boundary between a first image constructable from the first video signal and a second image constructable from the second video signal. The first video controller transmits the first digital video signal to the decoder while monitoring the signal for the selected luminance component. When the selected luminance component is detected, a colorkey signal is generated by the first video controller and transmitted to the second video controller to initiate transmission of the second digital video signal to the decoder in place of the first digital video signal. The first video controller continues to monitor the first video signal until the absence of the selected luminance component is detected. The first video controller then transmits a second colorkey signal to the second video controller to terminate the second digital video signal and transmission of the first digital video signal to the decoder recommences.

In various aspects of this embodiment of the invention, the digital video signals are encoded into a format in which the data for a pair of consecutive pixel elements are contained in four bytes of the digital video signals and control signals are utilized so that merging of the video signals only occurs between pixel pairs. In one of these aspects, initiation of the transmission of the second digital video signal after detection of the selected luminance component is delayed until after the pair of consecutive pixel elements which includes the selected luminance component are transmitted to the decoder and, in another aspect, the delay is achieved by transmitting the first and second digital video signals to a multiplexer where a multiplexer control signal generated by the second video controller is utilized to switch the multiplexer from a first setting where the first digital video signal is transmitted to the decoder to a second setting where the second digital video signal is transmitted to the decoder. In yet another aspect, termination of the second digital video signal and recommencement of the first digital video signal is delayed until the completion of the transmission of the pair of consecutive pixel elements being transmitted by the second video controller when the second colorkey signal is received and, in still yet another aspect, a multiplexer control signal which switches the multiplexer from the second setting to the first setting is generated after the transmission of the pair of consecutive pixel elements being transmitted by the second video controller when the second colorkey signal was received is complete.

In another embodiment of the invention, the present invention is a method for merging first and second video signals generated by first and second video controllers, respectively, and encoded in a format having a first field containing a luminance component for a first pixel element of a pair of consecutive pixel elements of a video signal, a second field containing a first chrominance component for said pair of pixel elements, a third field containing a luminance component for a second pixel element of said pair of pixel elements and a fourth field containing a second chrominance component for said pair of pixel elements. A luminance component which identifies a boundary between a first image constructed from said first digital video signal and a second image constructed from said second digital video signal is selected. The first digital video signal is transmitted to a multiplexer switched to a first setting where said first digital video signal is transmitted to the decoder. When the selected luminance component is detected in the first video signal, a colorkey signal for initiating transmission of the second digital video signal is transmitted to the second video controller. After the pair of consecutive pixel elements of the first video signal which includes the selected luminance component are transmitted to the decoder, the multiplexer is switched to a second setting where the second digital video signal is transmitted to the decoder and transmission of the second digital video signal to the multiplexer commences. When the absence of the selected luminance component from the first digital video signal is detected, a second colorkey signal which initiates termination of transmission of the second digital video signal to the multiplexer is generated. When transmission of the pair of pixel elements being transmitted by the second video controller when the second colorkey signal was received is complete, the multiplexer is switched to the first setting where the first digital video signal is transmitted to the decoder, transmission of the second digital video signal is terminated and transmission of the first digital video signal to the decoder recommences.

In one aspect of this embodiment of the invention, first and second clock signals are generated to respectively clock the first and second digital video signals into said decoder. A first multiplexer control signal which switches the multiplexer from the first setting to the second setting is generated on the first falling edge of the first clock signal after the fourth rising edge of the first clock signal after generation of the first colorkey signal and a second multiplexer control which switches the multiplexer from the second setting to the first setting is generated on the first falling edge of the first clock signal after the fourth rising edge of the first clock signal after generation of the second colorkey signal.

BRIEF DESCRIPTION OF THE DRAWINGS

The present invention may be better understood, and its numerous objects, features and advantages will become apparent to those skilled in the art by reference to the accompanying drawings in which:

FIG. 4a is a diagram of the configuration of each of the first and second video signals to be merged by the apparatus of FIG. 3;

FIG. 4b is a diagram of an alternate configuration of the video signals to be merged by the apparatus of FIG. 3.

DETAILED DESCRIPTION OF A PREFERRED EMBODIMENT

Figure 1:
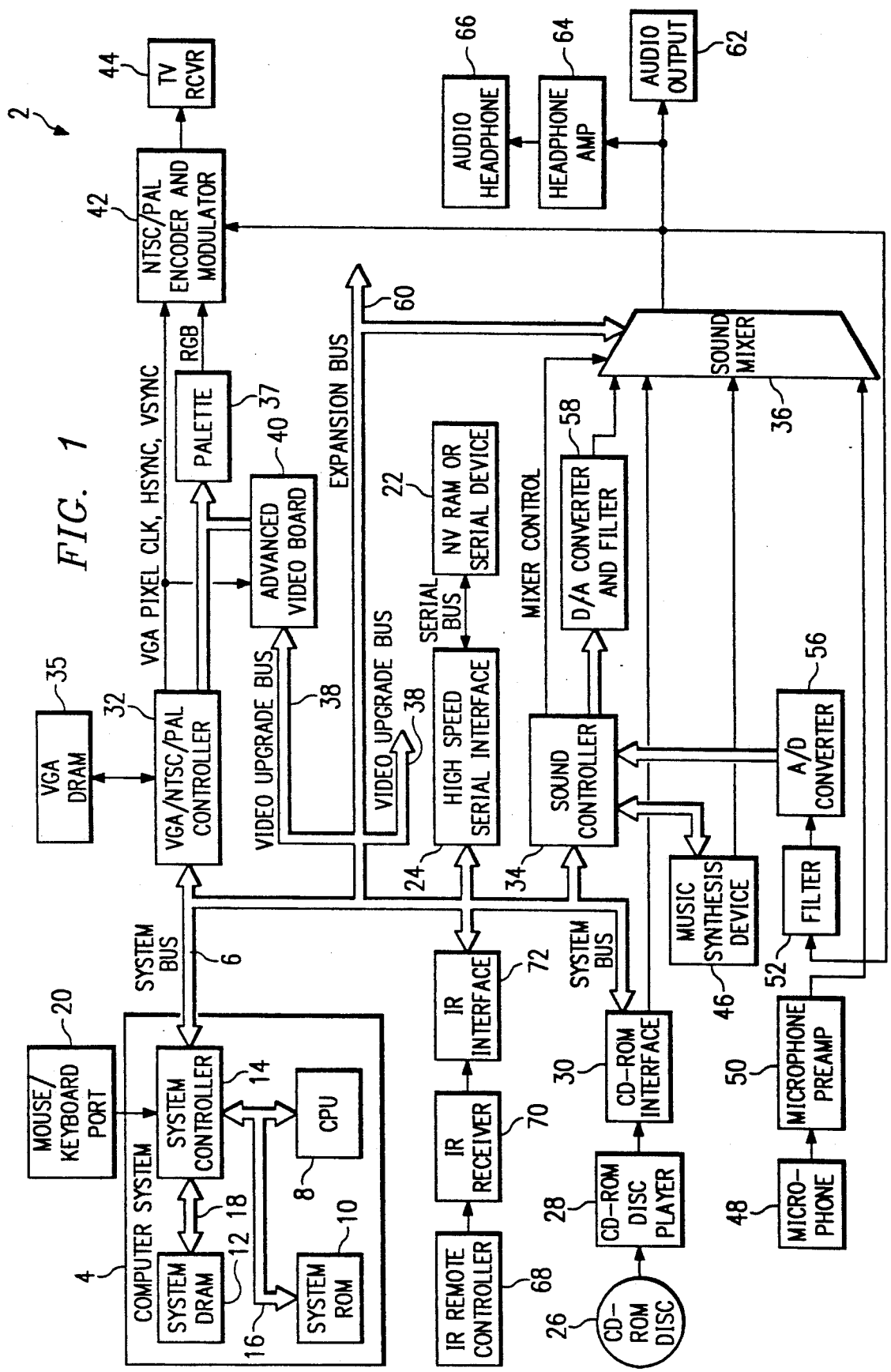
FIG. 1 is a block diagram of a multimedia system configured to merge video data signals from multiple sources in a single display and constructed in accordance with the teachings of the present invention.

Referring first to FIG. 1, a multimedia system configured to merge video data signals from multiple sources in a single display shall now be described in greater detail. The multimedia system 2 is configured to receive audio and/or video signals from multiple sources and transmit the received signals to selected audio and/or video reproduction equipment associated with the multimedia system 2. The overall operation of the multimedia system 2 is controlled by a general purpose computer system 4 such as a desktop computer operably connected with the remainder of the multimedia system 2 by a system bus 6. In addition to managing the flow of data and control signals between the various components of the multimedia system 2, it is contemplated that the computer system 4 shall be capable of running software applications and, if desired, utilizing the video and/or sound components of the multimedia system 2 for display and/or audio generation purposes.

The computer system 4 includes a central processing unit (or "CPU") 8 such as an 80286 microprocessor, a system read only memory (or "ROM") unit 10, a system dynamic random access memory (or "DRAM") unit 12 for storing data and a system controller 14. The CPU 8, the system ROM 10 and the system controller 14 are interconnected by address, data and control bus 16 for the transfer of address, data and control signals therebetween. Similarly, an address, data and control bus 18 interconnects the system DRAM unit 12 and the system controller 14 for the transfer of address, data and control signals therebetween. A mouse/keyboard port 20 operatively connected to the system controller 14 for operator input of data or control signals via a mouse, computer keyboard or other input device. Finally, additional data transfer and/or data storage capability is provided by a serial device 22 operatively connected to the system bus 6 via a high speed serial interface 24. For example, in the embodiment of the invention illustrated herein, the serial device 22 is a non-volatile (or "NV") RAM which provides powered down storage capacity for the computer system 4. Alternately, serial device 22 may be a printer, modem or other serial device commonly used in two way data transfers.

Data may be input to the multimedia system 2 using a compact disc read only memory (or "CD-ROM") 26 having video, audio, text, computer software, and/or other data stored thereon. For example in co-pending U.S. patent application Ser. No. 07/770,544 filed Oct. 2, 1991, entitled METHOD AND APPARATUS FOR ENCODING VIDEO COLOR DATA SIGNALS AND PROTOCOL FOR ENCODING SAME and previously incorporated by reference, discloses full color video data signals digitally encoded in a format suitable for storage on a CD-ROM. The CD-ROM 26 is inserted in a CD-ROM disc player 28 which reads the digitally encoded data stored on the CD-ROM 26 and transmits the data to a CD-ROM interface 30. The CD-ROM interface 30 identifies the type of data read from the CD-ROM 26 and transmits the data to an appropriate multimedia system component via the system bus 6. For example, video signals would most commonly be transmitted to a VGA/NTSC/PAL controller 32 (hereafter referred to as "VGA controller 32"), audio signals to a sound controller 34 and computer programs to the computer system 4, although, it is contemplated that, in certain applications, digitally encoded data would be transferred to the computer system 4 for processing and/or storage purposes before reaching its final destination. Also, certain audio signals identified by the CD-ROM interface 30 may be what is commonly referred to as "red book" audio signals and which are directly transferred to a sound mixer 36 via an audio connection between the CD-ROM interface 30 and the sound mixer 36.

Encoded video signals transferred to the VGA controller 32 are transferred to a memory subsystem, for example, a 256K DRAM 35, for storage prior to display. To display selected ones of the encoded video signals stored in the VGA DRAM 35, the VGA controller 32 instructs the VGA DRAM 35 to transmit the selected encoded digital video signals to a palette 37 via the VGA controller 32. The palette 37 decodes the encoded digital video signals, converts the signals into red, green and blue (or "RGB") components, and then converts the RGB video signals into analog form. It is contemplated that the VGA controller 32 will be configured to drive the operation of the palette 37 in various modes, thereby enabling the multimedia system 2 to display high color content natural images, animation images as well as combinations of the two. It is further contemplated that the palette 37 will be configured to perform multiple modes of decoding, including compressed YUV and border encoding, thereby permitting the multimedia system 2 to produce an enhanced display of various types of video data, including full motion, animated and still images.

A video upgrade bus 38 is provided so that auxiliary boards capable of driving the operation of the palette 10 in still other imaging modes may be installed in the multimedia system 2. Specifically, in the multimedia system 2 described and illustrated herein, an advanced video (or "AV") board 40, which includes a video controller configured to operate in a manner similar to the VGA controller 32, has been installed on the video upgrade bus 38. In a manner to be more fully described below, the AV board 40 interacts with the VGA controller 32 and the palette 37 so that a first video image supplied by the VGA controller 32 and a second video image supplied by the advanced video board 40 may be merged on the palette 37 so that a merged video image may be produced by the multimedia system 2.

The analog RGB video signals are then transmitted to a NTSC/PAL encoder and modulator 42 which, under the control of the VGA pixel clock or "CLK") signal and horizontal and vertical synchronizing (or "HSYNC and VSYNC") signals from the VGA controller 32, modulates the received RGB video signals into a form suitable for display by the video display component of television (or "TV") receiver 44. Audio signals are transmitted to the audio generation component of the television receiver 44 by a sound mixer 36 which transmits audio signals to the NTSC/PAL encoder and modulator 42 which synchronizes the audio and video signals before transmission to the television receiver 44.

As previously discussed, the multimedia system 2 includes a sound controller 34 which, in conjunction with the system controller 14, controls the transmission of audio signals between various sources and destinations. In addition to those audio signal sources and destinations previously discussed, digital audio signals may also be generated by a music synthesis device 46 and transmitted directly to the sound controller 34 or by the computer system 4 and transmitted to the sound controller 34 via the system bus 6. Analog input audio signals such as live sounds may be detected by a microphone 48, transmitted to a microphone pre-amp 50 which amplifies the input audio signal. The output of the microphone pre-amp 50 is transmitted directly to the sound mixer 36 for mixing with signals from other sound sources such as the music synthesis device 46, the CD-ROM disk 26 or others. The mixed sound signal is then filtered by an anti-aliasing filter 52, digitized by an analog to digital converter 54 and transmitted to the sound controller 34. The sound controller 34 transmits the digital audio signals received from the various sources to a digital to audio converter 58 for conversion to analog and, in turn, to the sound mixer 36.

In addition to the multiple source originating, analog audio signals received from the digital to analog converter 58, the sound mixer 36 is connected to receive audio signals from the CD-ROM interface 30, the music synthesis device 46, the microphone pre-amp 50 and, if direct audio capability is installed on the expansion 60 to the system bus 6, from the expansion bus 60 as well. Under control signals generated by the sound controller 34, the sound mixer 36 will select the audio signal to be output and propagate the selected signal to an audio output 62 which may be, for example, a speaker system, or, via a headphone amp 64, to an audio headphone 66.

Operator control of the various components of the multimedia system 2 from a remote location is provided by a hand-held infra-red remote controller 68. Upon operator actuation, the infra-red remote controller 68 transmits a control signal capable of detection by a IR receiver 70 which also transmits the detected control signal to the system bus 6 via an IR interface 72.

Figure 2:
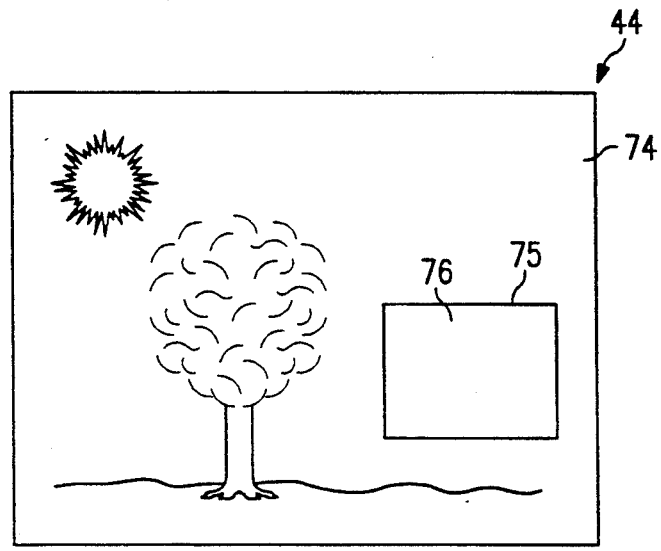
FIG. 2 is a front view of a video display of the multimedia system of FIG. 1 in which an illustrative display of merged video data signals may be seen.

Referring next to FIG. 2, a merged display comprised of first and second images merged together and displayed by the television receiver 44 shall now be described in greater detail. As seen here, the television receiver 44 includes a display upon which a first image 74 and a second image 76 may be simultaneously viewed. It is contemplated that the first and second images 74, 76 which comprise the merged display may be any combination of still and/or motion picture images. For example, the merged image may be comprised of a still picture image 74 and a motion picture image 76 positioned within the still picture image 74. As will be more fully described below, first and second video signals are transmitted by the VGA controller 32 and the AV video board 40, respectively, to the palette 37 where the first and second video signals are merged by detecting boundaries 75 between the images 74, 76 and forming a merged video signal which switches between the first and second video signals based upon the detection of the boundaries 75. The NTSC PAL encoder and modulator 42 receives the merged video signal from the palette 37 and produces the merged image therefrom. It is contemplated that, in alternate embodiments of the invention, the border 75 within which the second image 76 is inserted may be of varied dimensions. For example, the border 75 may be dimensioned to displace a portion of the first image 74 or may be dimensioned to displace the first image 74 in its entirety.

Figure 3:
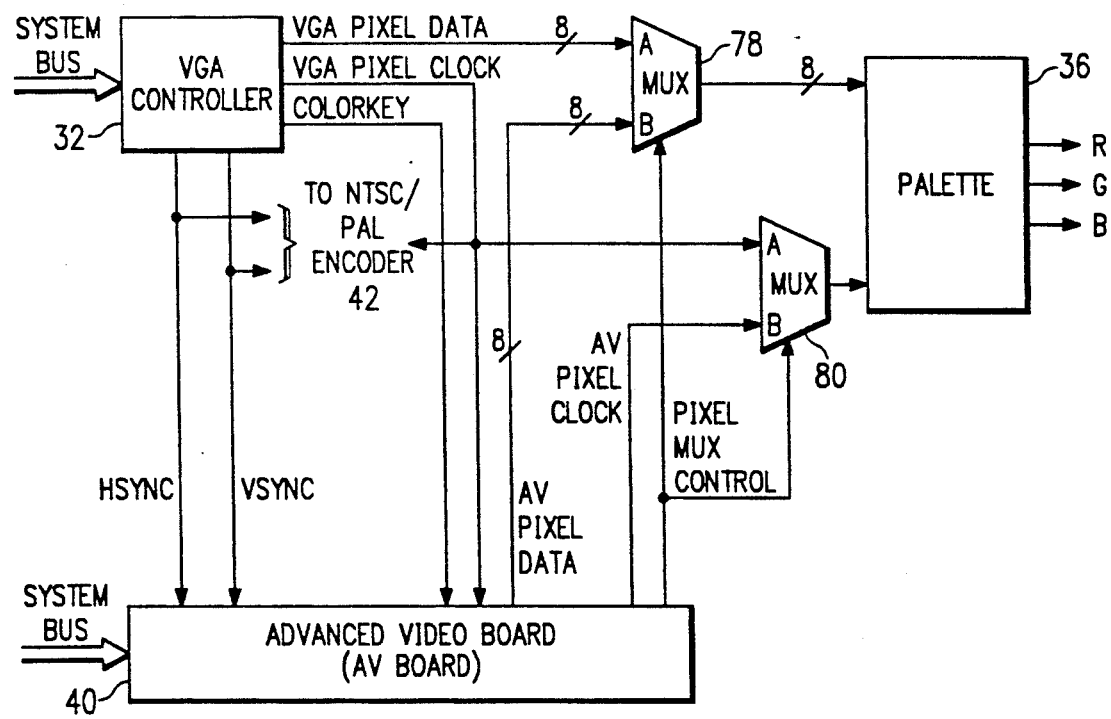
FIG. 3 is a block diagram of an apparatus for digitally merging video data signals from first and second sources incorporated in the multimedia system of FIG. 1.

Referring next to FIG. 3, the generation of a merged image on the display of the television receiver by defining a border within the first image 74 and inserting the second image 76 within that border shall now be described in greater detail. A first group of encoded video signals which correspond to the first video image 74 are transferred to the VGA controller 32. While it is contemplated that the first group of encoded video signals may be encoded in various types of formats, it is preferred that the first group of encoded video signals be encoded in a digital YUV 4:2:2 format such as that described in co-pending U.S Patent application Ser. No. 07/770,544 filed Oct. 2, 1991, entitled METHOD AND APPARATUS FOR ENCODING VIDEO COLOR DATA SIGNALS AND PROTOCOL FOR ENCODING SAME and previously incorporated by reference. For example, the first group of encoded digital video signals may be encoded on the CD-ROM disc 26, read by the CD-ROM disc player 28, transmitted, via the CD-ROM interface 30 and the system bus 6 to the VGA controller 32.

Similarly, a second group of encoded video signals which correspond to the second video image 74 are transferred to the advanced video board 40. The second group of encoded video signals should be encoded in the same format as the first group of encoded video signals, again preferably in the digital YUV 4:2:2 format. The second group of encoded video signals may originate from any of the video signal inputs included as part of the multimedia system 2 but typically originate from the same source as the first group of video signals which, in the present example, is the CD-ROM disc 26.

Referring next to FIG. 4a, the format for the digital YUV 4:2:2 encoded video signals shall now be described in greater detail. Here, encoded video signals are transmitted in pairs of consecutive pixel elements encoded in 32 bits (or 4 bytes) of data. Of the four bytes used to encode a pair of consecutive pixel elements, byte 1 defines a unique 8 bit value for a luminance component Y for a first pixel element of the pixel element pair, byte 2 defines an 8 bit value for a first chrominance component U common to the first and second pixel elements of the pixel element pair which is determined by averaging the first chrominance component U over the pixel pair, byte 3 defines a unique 8 bit value for the luminance component Y for a second pixel element of the pixel element pair and byte 4 defines an 8 bit value for a second chrominance component V common to the first and second pixel elements of the pixel element pair which is determined by averaging the second chrominance component V over the pixel pair. Thus, in this configuration, a pair of consecutive pixel elements (0,1) would be encoded as (Y0,U01,Y1,V01).

Referring next to FIG. 4b, the digital YUV 4:2:2 format of the encoded video signals of FIG. 4a shall now be described in greater detail. Here, a 32 bit (4 byte) encoded video signal for a pair of consecutive pixel elements (0,1) would again be configured as (Y0,U02,Y1,V01). After merging of the first and second video signals, the 8 bit first and second chrominance components for pixel element 1 are interpolated from the encoded chrominance information for adjacent pixel elements. For example, the palette 37 may interpolate the chrominance information for pixel element 1 when decoding the encoded merged video signal. In this case, the palette 37 would determine interpolated values of $[(U0.U2)/2]$ and $[(V0.V2)/2]$ for the U and V components of pixel element In an alternate configuration, the interpolation may be disabled and the same U and V values, for example, U0 and V0, are used for two consecutive pixel elements (or "PELs"), for example, PEL0 and PEL1.

Returning now to FIG. 3, the merging of a first YUV encoded video signal from the VGA controller 32 and a second YUV video signal from a second video controller installed on and included as part of the AV board 40 shall now be described in greater detail. The HSYNC and VSYNC signals are also provided to the AV board 40 to ensure that the video signals from the AV board 40 are synchronized with the video signals from the VGA controller 32. Specifically, the AV board 40 uses the HSYNC and VSYNC signals as a reference for generating its own pixel clock. Merging of the first and second video signals from the VGA controller 32 and the AV board 40 is accomplished utilizing a first multiplexer 78 connected to receive video data signals, typically, video pixel data encoded in the 4:2:2 YUV format previously described, from the VGA controller 32 and the advanced video board 40, respectively, and a second multiplexer 80 connected to receive a VGA pixel clock signal from the VGA controller 32 and a AV pixel clock signal from the AV board 40. Although illustrated in FIG. 3 as separate components, the first and second multiplexers 78, 80 would typically be incorporated as part of the palette 37. Furthermore, while the use of multiplexers is disclosed herein, it is specifically contemplated that a tri-state bus would be equally satisfactory for use herein.

In addition to the signals already described, the VGA controller 32 also generates a colorkey signal in response to detecting the boundary 75 between the first image 74 and the second image 76. The colorkey signal is then transmitted to the AV board 40 which controls the merging of the first and second video signals into a merged video signal. The boundary 75 is detected in the following manner. As previously set forth, the luminance component of each pixel element is encoded in 8 bits. Thus, the luminance component may have any one of $2^8$ (or 256) values. As certain of the 256 possible values for the luminance component will occur very infrequently, such an infrequently occurring value may be utilized for other purposes, i.e., to indicate the boundary 75 between the first image 74 and the second image 76. For example, the luminance values Y=00 or Y=01, which correspond to very dark shades of black typically unusable in generating an image since any corresponding chrominance components U or V are not visible, may be used to indicate the boundary 75.

After selecting a luminance component to indicate the boundary 75, the first video signal should be constructed such that the selected luminance component is encoded at the location or locations where the second image 76 is to be produced. When the luminance component of the first video signal matches the selected value, a colorkey signal is generated by the VGA controller 32. For example, system software loaded into the computer system 4 may initiate the generation of a merged image by determining a location or locations within the first image 74 where the second image 76 should be inserted and re-encoding the original encoded video signal received from the CD ROM disc 2 such that the luminance component corresponding to the selected luminance component is encoded at the determined location or locations.

The encoded video signal having the selected luminance component encoded at the location or locations where the second image 76 is to be inserted is transmitted to the VGA controller 32 which, in turn, sequentially transmits the luminance and chrominance components for each consecutive pixel element pair forming the first image 74 to the multiplexer 78 and simultaneously transmits a VGA pixel clock signal to the multiplexer 80 for clocking the first (or "VGA") encoded video data signal transmitted to the multiplexer 78 into the palette 37. Each luminance component of the video signal transmitted to the VGA controller 32 is also propagated to a comparator (not shown) included as part of the VGA controller 32. The comparator detects the boundary 75 of the second image 76 by comparing each 8 bit luminance component input thereto to the 8 bit selected luminance component. When the selected luminance component is detected by the VGA controller 32, a colorkey signal is generated by the VGA controller 32 and is transmitted to the AV board 40 where transmission of the second (or "AV") encoded video signal is commenced by asserting the left-most luminance value for the second image 76 and by asserting a control signal PIXELMUX which signals the multiplexers 78, 80 to transmit data and clock signals originating at the AV board 40 to the palette 37. The AV board 40 continues to transmit, via the multiplexers 78, 80, data and clock signals to the palette 37 until the luminance component of the VGA video data signal no longer corresponds to the selected luminance component. The colorkey signal is then deasserted and, in response to the deassertion of the colorkey signal, the AV board 40 deasserts the PIXELMUX control signal, thereby signalling the multiplexers 78, 80 to recommence transmitting data and clock signals originating at the VGA controller 32.

Figure 5:
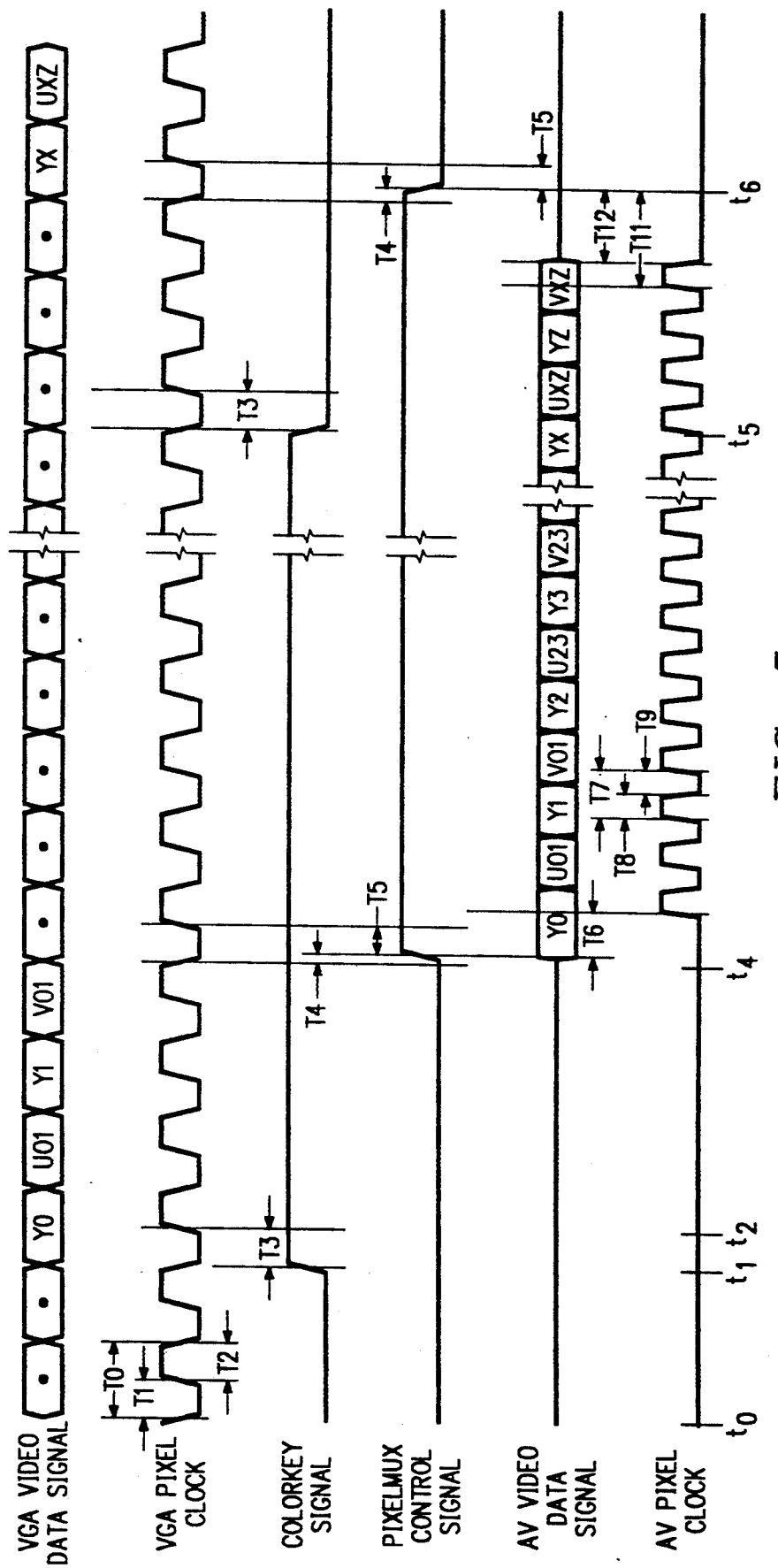
FIG. 5 is a timing diagram which illustrates the merging of first and second video signals.

Referring next to FIG. 5, the merging of the first and second video signals on a line-by-line basis will now be described in greater detail. Initially (at $t=t_0$), the colorkey signal generated by the VGA controller 32, and therefore, the PIXELMUX control signal generated by the AV board 40 as well, are low. Video data signals output by the VGA controller 32 and corresponding to the first image 74 are input the multiplexer 78 and clocked into the palette 37 by the VGA pixel clock signal. Typically, the VGA pixel clock signal will clock in a byte of video data from the VGA controller 32 into the palette 37 on a rising edge of the VGA pixel clock signal and changes the data on a falling edge of the VGA pixel clock signal, typically at a clock rate T0 in the range of 7.1 to 14.4 MHz. For example, the low period T1 of the VGA pixel clock signal may be 35 nanoseconds and the high period T2 of the VGA pixel clock signal may also be 35 nanoseconds.

When the line-by-line transmission of the VGA video data signal reaches the boundary 75 of the second image 76, the luminance component Y0 of the first pixel of the second image 76 equals the selected luminance component and the VGA controller 32 asserts the colorkey signal high at $t=t_1$. When the VGA pixel clock goes high after the colorkey signal goes high (typically a delay time T3 = 10 nanoseconds), the luminance component of the VGA video data signal at the boundary of the second image 76 is clocked into the palette 37. Before the AV board 40 can begin transmitting the AV video data signal to the palette 37, however, the remainder of the pair of consecutive pixels (Y0, U01, Y1, V01) of the VGA video data signal being transmitted when the colorkey signal was asserted must be clocked into the palette 37. The AV board 40, therefore, must wait for three more rising edges of the VGA pixel clock before the transmission of the AV video data signal can commence.

On the fourth rising edge of the VGA pixel clock while the colorkey signal remains high, the AV board 40 asserts the left-most value of the AV pixel data and asserts the AV pixel clock low. However, no data signals transmitted by the AV board 40 can be transmitted to the palette 37 because the PIXELMUX control signal remains low. At $t=t_4$, the first falling edge of the VGA pixel clock signal after the fourth rising edge, the VGA pixel clock signal goes low. The AV board 40 responds, typically after a delay T4 of 5 nanoseconds, by asserting the PIXELMUX control signal high, thereby taking control of the multiplexers 78 and 80 and the resultant outputs from the multiplexers 78, 80 to the palette 37. AV video data signals originating at the AV board 40 may now be transmitted to the palette 37 after a setup period T5 which typically lasts 15 nanoseconds and a signal change setup period T6 which typically lasts 10 nanoseconds. Similar to the VGA controller 32, video data signals transmitted by the AV board 40 are clocked in on the rising edge of the AV pixel clock signal and changed on the falling edge of the AV pixel clock signal, typically at a clock rate T7 having a maximum frequency of 60 MHz. For example, the low period T8 of the AV pixel clock may be 10 nanoseconds and the high period T9 of the pixel clock may also be 10 nanoseconds.

Transmission of AV video data signals to the palette 37 continues while the VGA controller 32 monitors the VGA video data signal. When the VGA controller 32 detects another boundary 75 between the second image 76 and the first image 74 is detected, the luminance component Y0 of the first pixel of the first image 74 after the boundary 75 will no longer equal the selected luminance component and the VGA controller 32 will deassert the colorkey at $t=t_5$. Control of the multiplexers 78, 80 cannot be returned, however, until after transmission of the pixel pair currently being transmitted to the palette 37 by the AV board 40 is complete. Therefore, at $t=t_6$, the PIXELMUX signal is deasserted on the first falling edge of the VGA pixel lock after the fourth rising edge of the VGA pixel clock after the colorkey signal goes low. The AV board 40 then deasserts the PIXELMUX signal, thereby returning control of the palette 37 to the VGA controller 32. Typically, the minimum delay period T11 after the AV pixel clock goes low and the minimum delay period T12 after the AV video data signal goes low and the deassertion of the PIXELMUX control signal should each be 20 nanoseconds. The retransmission of the video data signal (YX, UXZ, ...) may then recommence.

In the palette 37, the merged data is deformatted from the YUV format to an RGB format using the following equations:

$$B = Y + (U - 128) * 1.733 \qquad (1)$$

$$R = Y + (V-128) * 1.371 \quad (2)$$

$$G = Y - 0.698(V-128) - 0.336(U-128) \quad (3)$$

Thus, there has been described and illustrated herein a method and apparatus for merging first and second video signals and a multimedia system which incorporates the same. Those skilled in the art, however, will recognize that many modifications and variations besides those specifically mentioned may be made in the techniques described herein without departing substantially from the concept of the present invention. Accordingly, it should be clearly understood that the form of the invention as described herein is exemplary only and is not intended as a limitation of the scope of the invention.

What is claimed is:

1. For digital video signals having luminance and chrominance components, a method for merging a first digital video signal generated by a first video controller and a second digital video signal generated by a second video controller for merged transmission to a digital video signal decoder, wherein said first and second digital video signals are comprised of a series of data bytes, said method comprising the steps of:

designating a selected luminance component as identifying a boundary between a first image constructed from said first digital video signal and a second image constructed from said second digital video signal;

generating a first clock signal for clocking said first digital video signal into said decoder, said first clock signal clocking data bytes into said decoder on rising edges and changing data bytes on falling edges;

transmitting said first digital video signal to said decoder;

detecting said selected luminance component in said first video signal;

generating a colorkey signal at said first video controller and transmitting said colorkey signal to said second video controller to initiate transmission of said second digital video signal;

replacing said first digital video signal with said second digital video signal for transmission to said decoder;

detecting the absence of said selected luminance component on said first digital video signal;

deasserting said colorkey signal to initiate termination of transmission of said second digital video signal; and recommencing transmission of said first digital video signal to said decoder.

2. A method for merging first and second digital video signals according to claim 1 and further comprising the step of encoding said first digital video signal in a format wherein data for a pair of consecutive pixel elements are contained in four sets of bits of said first digital video signal, said format having a first set of bits containing a luminance component for one of said pair of pixel elements, a second set of bits containing a first chrominance component for said pair of pixel elements, a third set of bits containing a luminance component for the other of said pair of pixel elements and a fourth set of bits containing a second chrominance component for said pair of pixel elements.

3. A method for merging first and second digital video signals according to claim 2 wherein said first chrominance component for said pair of pixel elements is determined by averaging the first chrominance component for the first of said pixel element pair and the first chrominance component for the second of said pixel element pair and wherein said second chrominance component for said pair of pixel elements is determined by averaging the second chrominance component for the first of said pixel element pair and the second chrominance component for the second of said pixel element pair.

4. A method for merging first and second digital video signals according to claim 2 wherein said selected luminance component is contained in said first set of bits of said encoded digital video signal.

5. A method for merging first and second digital video signals according to claim 4 wherein the step of generating a colorkey signal at said first video controller and transmitting said colorkey signal to said second video controller to initiate transmission of said second digital video signal further comprises the steps of:

comparing said first set of bits of said encoded digital video signal to said selected luminance component; and generating said colorkey signal when said first set of bits of said encoded digital video signal is equal to said selected luminance component.

6. A method for merging first and second digital video signals according to claim 4 and further comprising the step of delaying the initiation of the transmission of said second digital video signal until said pair of consecutive pixel elements which includes said selected luminance component are transmitted to said decoder.

7. A method for merging first and second digital video signals according to claim 6 wherein the step of transmitting said second digital video signal further comprises the step of generating a second clock signal for clocking said second digital video signal into said decoder, said second clock signal clocking data bytes into said decoder on rising edges and changing data bytes on falling edges.

8. A method for merging first and second digital video signals according to claim 6 wherein said first and second digital video signals are transmitted to a multiplexer and wherein the step of replacing said first digital video signal with said second digital video signal for transmission to said decoder further comprises the step of generating a multiplexer control signal upon transmission of said pair of consecutive pixel elements which include said selected luminance component to said decoder, said multiplexer control signal switching said multiplexer from a first setting where said first digital video signal is transmitted to said decoder to a second setting where said second digital video signal is transmitted to said decoder.

9. A method for merging first and second digital video signals according to claim 8 and further comprising the step of encoding said second digital video signal in a format wherein data for a pair of consecutive pixel elements are contained in four sets of bits of said second digital video signal, said format having a first set of bits containing a luminance component for one of said pair of pixel elements, a second set of bits containing a first chrominance component for said pair of pixel elements, a third set of bits containing a luminance component for the other of said pair of pixel elements and a fourth set of bits containing a second chrominance component for said pair of pixel elements.

10. A method for merging first and second digital video signals according to claim 9 wherein said first chrominance component for said pair of pixel elements of said second digital video signal is determined by averaging the first chrominance component for the first of said pixel element pair and the first chrominance component for the second of said pixel element pair and wherein said second chrominance component for said pair of pixel elements of said second digital video signal is determined by averaging the second chrominance component for the first of said pixel element pair and the second chrominance component for the second of said pixel element pair.

11. A method for merging first and second digital video signals according to claim 9 wherein said colorkey signal is deasserted when said selected luminance component is absent from said first set of bits of said encoded digital video signal.

12. A method for merging first and second digital video signals according to claim 11 wherein the step of deasserting said colorkey signal to initiate termination of transmission of said second digital video signal further comprises the step of delaying the termination of the transmission of said second digital video signal until the completion of the transmission of said pair of consecutive pixel elements being transmitted by said second video controller when said colorkey signal was deasserted.

13. A method for merging first and second digital video signals according to claim 12 wherein the step of recommencing transmission of said first digital video signal to said decoder further comprises the step of generating a multiplexer control signal after transmission of said pair of consecutive pixel elements being transmitted by said second video controller when said colorkey signal was deasserted, said multiplexer control signal switching said multiplexer from said second setting to said first setting.

14. A method for merging first and second digital video signals according to claim 12 wherein the step of recommencing transmission of said first digital video signal to said decoder further comprises the step of generating a multiplexer control signal after transmission of said pair of consecutive pixel elements being transmitted by said second video controller when said colorkey signal was deasserted and after transmission of said pair of consecutive pixel elements being transmitted by said first video controller when said colorkey signal was deasserted, said multiplexer control signal switching said multiplexer from said second setting to said first setting.

15. For digital video signals encoded in a format having a first set of bits containing a luminance component for a first pixel element of a pair of consecutive pixel elements of a video signal, a second set of bits containing a first chrominance component for said pair of pixel elements, a third set of bits containing a luminance component for a second pixel element of said pair of pixel elements and a fourth set of bits containing a second chrominance component for said pair of pixel elements, a method for merging a first digital video signal generated by a first video controller and a second digital video signal generated by a second video controller for merged transmission to a digital video signal decoder, comprising the steps of:

designating a selected luminance component as identifying a boundary between a first image constructed from said first digital video signal and a second image constructed from said second digital video signal;

transmitting said first digital video signal to a multiplexer, said multiplexer switched to a first setting wherein said first digital video signal is transmitted to said decoder;

detecting said selected luminance component in said first video signal;

generating a first clock signal for clocking said first digital video signal into said decoder;

generating a colorkey signal at said first video controller and transmitting said colorkey signal to said second video controller to initiate transmission of said second digital video signal to said multiplexer;

switching said multiplexer to a second setting wherein said second digital video signal is transmitted to said decoder after said pair of consecutive pixel elements of said first video signal which includes said selected luminance component are transmitted to said decoder;

transmitting said second digital video signal to said multiplexer switched to said second setting, said multiplexer transmitting said second digital video signal to said decoder;

generating a second clock signal for clocking said second digital video signal into said decoder;

detecting the absence of said selected luminance component in said first digital video signal;

deasserting said colorkey signal to initiate termination of transmission of said second digital video signal to said multiplexer;

delaying termination of the transmission of said second digital video signal to said multiplexer until the completion of the transmission of said pair of consecutive pixel elements being transmitted by said second video controller when said colorkey signal was deasserted;

switching said multiplexer to said first setting wherein said first digital video signal is transmitted to said decoder after said pair of consecutive pixel elements being transmitted by said second video controller when said colorkey signal was deasserted are transmitted to said decoder; and recommencing transmission of said first digital video signal to said decoder.

16. A method for merging first and second digital video signals according to claim 15 and further comprising the step of generating a first multiplexer control signal to switch said multiplexer from said first setting to said second setting, said first multiplexer control signal generated on the first falling edge of said first clock signal after the fourth rising edge of said first clock signal after generation of said colorkey signal.

17. A method for merging first and second digital video signals according to claim 16 and further comprising the step of generating a second multiplexer control signal to switch said multiplexer from said second setting to said first setting, said second multiplexer control signal generated on the first falling edge of said first clock signal after the fourth rising edge of said first clock signal after deassertion of said colorkey signal.

* * * * *

UNITED STATES PATENT AND TRADEMARK OFFICE
CERTIFICATE OF CORRECTION

PATENT NO. : 5,218,432
DATED : June 8, 1993
INVENTOR(S) : Carl K. Wakeland It is certified that error appears in the above-identified patent and that said Letters Patent is hereby corrected as shown below:

Column 7, line 67, "(Y0-,)" should be --(Y0, --.

Column 8, line 8, "[(U0,U2)/2]" should be --[(U0+U2)/2]--.

Column 8, line 8, "[(V0,V2)/2]" should be --[(V0+V2)/2]--.

Column 8, line 9, "element In" should be --element. In--.

Signed and Sealed this

Eleventh Day of October, 1994

*Attest:*

BRUCE LEHMAN

*Attesting Officer*  *Commissioner of Patents and Trademarks*